United States Patent
von Groll et al.

(10) Patent No.: US 7,933,843 B1
(45) Date of Patent: Apr. 26, 2011

(54) MEDIA-BASED COMPUTATIONAL INFLUENCER NETWORK ANALYSIS

(75) Inventors: Goetz von Groll, Zurich (CH); Stoyan Mihov, Sofia (BG); Christofer Solheim, London (GB); Dag Dyrdal, Oslo (NO)

(73) Assignee: Commeq Ltd., London (GB)

( * ) Notice: Subject to any disclaimer, the term of this patent is extended or adjusted under 35 U.S.C. 154(b) by 619 days.

(21) Appl. No.: 11/845,112

(22) Filed: Aug. 27, 2007

Related U.S. Application Data

(60) Provisional application No. 60/767,571, filed on Aug. 26, 2006.

(51) Int. Cl.
*G06Q 99/00* (2006.01)
*G07F 17/27* (2006.01)

(52) U.S. Cl. .......................................... 705/319; 704/9

(58) Field of Classification Search .................. 705/319; 704/9; 707/709, 710, 776, 777
See application file for complete search history.

(56) References Cited

U.S. PATENT DOCUMENTS

| | | | | |
|---|---|---|---|---|
| 6,151,585 | A * | 11/2000 | Altschuler et al. | 705/10 |
| 7,143,091 | B2 * | 11/2006 | Charnock et al. | 1/1 |
| 7,143,135 | B2 * | 11/2006 | Smith et al. | 709/204 |
| 7,512,628 | B2 * | 3/2009 | Chess et al. | 1/1 |
| 7,653,568 | B2 * | 1/2010 | Keller et al. | 705/10 |
| 2002/0062368 | A1 * | 5/2002 | Holtzman et al. | 709/224 |
| 2005/0049908 | A2 * | 3/2005 | Hawks | 705/10 |

* cited by examiner

*Primary Examiner* — Jamisue A Plucinski
*Assistant Examiner* — Amanda Kirlin
(74) *Attorney, Agent, or Firm* — Buckley, Maschoff & Talwalkar LLC

(57) ABSTRACT

The methodology draws from three disciplines, namely public relations, social network analysis and computer-based information extraction. The analysis permits the visualization of how various people, organizations, products, subjects, key messages etc. are linked/form a network dynamic in media coverage. This type of analysis can assist corporations and other organizations to understand, plan and measure the effectiveness of communication.

13 Claims, 8 Drawing Sheets

Figure 3

MEDIA-BASED COMPUTATIONAL INFLUENCER NETWORK ANALYSIS

BACKGROUND

For over fifty years, sociologists have employed Social Network Analysis, sometimes referred to as Organizational Network Analysis, to map human relationships, typically by conducting a questionnaire-based survey in which each subject defines his/her relationship with the other individuals in the group that is being examined. Once the data have been gathered and entered, network analysis and network plotting are employed to visualize and characterize the network (for instance isolating connected components or calculating the average distance between individuals).

A similar approach can be used to examine public debates. Instead of collecting the data through the use of individual surveys, the researcher may extract the information from media and other public records, for instance extracting the names of individuals who are quoted in the debate about the economics of wind power from news paper coverage.

This approach here, which we have named Influencer Network Analysis (INA), concerns a method for the automatic discovery of relationships in media coverage through text mining and information extraction and subsequent analytical processes to produce network visualizations and reports which can assist corporations and other organizations to understand, measure and predict media coverage, and to plan and implement efficient communication strategies.

The method is applied on a project basis, usually focusing on a particular topic, issue, company or brand. The high level of automation permits economic processing of hundreds or thousands of articles from which both structured (fields) and unstructured (text, for instance a news paper article) information is extracted.

Given the high volume generated in the media on certain issues, it is of key operational importance that as much data preparation and data mining as possible can be performed by a computer in an automated, unsupervised modus. In order to perform this task computationally, the system must be able to extract the core entities in media reports automatically.

Information extraction is applied over the texts for the automatic recognition and extraction of named entities and marking them into predefined categories such as persons, organizations, locations, brands, etc. The named entity extraction system is based on linguistic grammar-based techniques as well as statistical methods.

SUMMARY

The method disclosed herein enables a highly automated media analysis of influencer networks, consisting of the following parts: establishing a data stream and data reformatting of media output relevant to the analysis project at hand; information extraction of said media stream; performing a computation characterizing the influencer network; and outputting a result of the computation.

Said information extraction may be carried out by an automated text mining processes capable of handling very high volume media data. The information thus extracted may be, but is not limited to, entities such as names of individuals, companies, brands, locations. Further optional manual enrichment such as favorability may augment the information extracted automatically. The information is then subjected to a computation of the influencer network characteristics such as Cohesion, Density, and Influence ranking in addition to the linkage between entities. The results are typically plotted in a graphical way to allow for an intuitive understanding of the influencer network.

BRIEF DESCRIPTION OF THE DRAWINGS

Exemplary embodiments will be described in relation to the following figures wherein:

FIG. 3 illustrates an exemplary user interface for the definition of scope for the analysis of an embodiment of the disclosed method;

OVERVIEW

The methodology presented here draws from three disciplines, namely public relations, social network analysis and computer-based entity extraction.

The study of influencers in the media is motivated by a desire to understand, and to some degree be able to influence the diffusion of ideas, stories and information through the media. Being able to understand the parameters of who is involved (key spokespersons), ranked by influence, how and with which speed and precision messages are propagated is essential in being able to plan, execute and evaluate communication strategies.

INA is by no means limited to the PR and Communications industry, but can equally be applied by management consultants, corporations or financial institutions for benchmarking and predicting reputation scores for companies or issues.

Social network analysis typically includes examining the following elements and properties (see [1], [2]):
Cohesion
Density of networks
Cores
Cliques/Sub-networks
Centre/Periphery/Average distance
Brokers and bridges
Roles and positions Most social network analysis is based on information about the relationships between individuals or groups of individuals. The analysis is a combination of concepts from social sciences with tools from graph theory for performing structural analysis on social networks. It can reveal and visualize structural network properties with significant value for explaining, modeling and influencing various social phenomena.

The general approach in social network analysis is to perform surveys and have people answer questionnaires, the results of which are then manually transferred into a computer and visualized. While in our methodology we use the above mentioned concepts derived from social network analysis, the large volume of coverage precludes a manual approach to categorization and parameterization of the content. As is described below, a massively computational approach with very limited user input or guidance is a key element in making our methodology a routine tool for corporations, public relations, management consultants and financial institutions.

Text mining processes are applied to the media articles, subjecting each to a collection of predefined grammar rules. The output of this process can be a set of entities, such as individuals, organizations/companies, locations, key messages, subjects etc, which are identified and tagged in the articles. From these tagged items in the articles it is then possible to compute the connectivity inputs that are required for network visualization and analysis.

Figure 1:
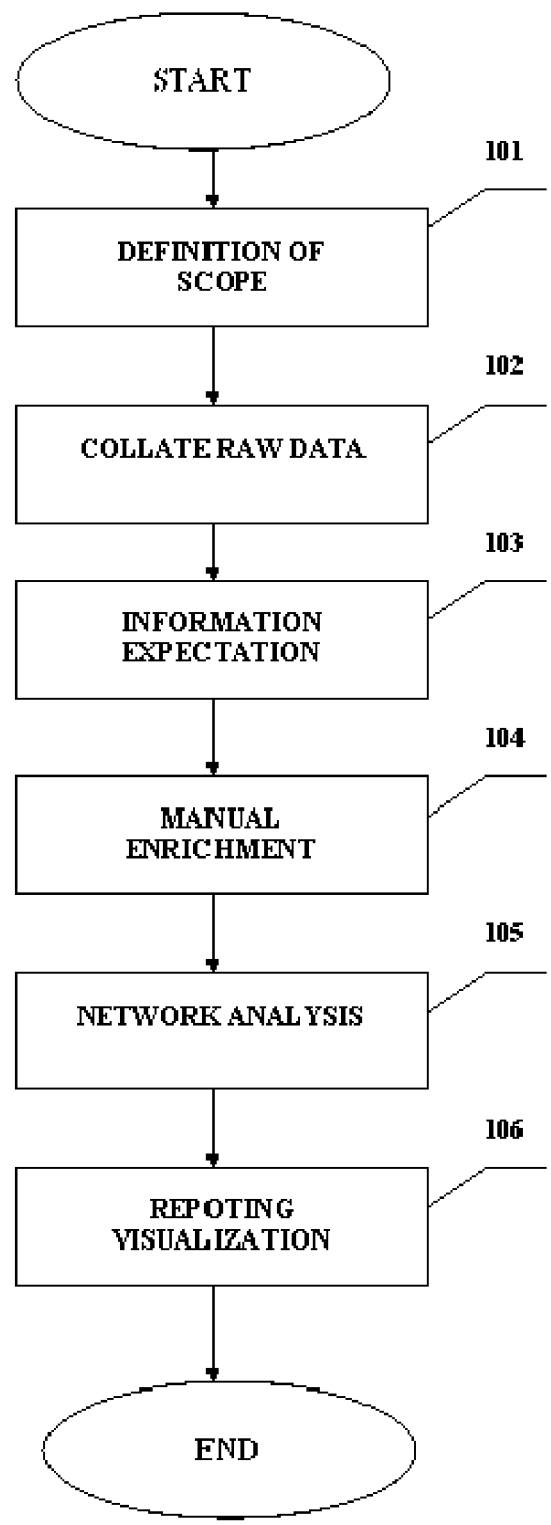
FIG. 1 illustrates an exemplary processes for influencer network analysis of an exemplary embodiment of the disclosed method.

The approach can thus be described with the following process steps:
(1) Definition of scope (subject criteria, sources, geographic, chronological)(101 in FIG. 1)
(2) Collate raw data (from media archives), reformat data and store (102)
(3) Information extraction (names of individuals, companies, brands, locations) (103)
(4) Optional manual entity enrichment (categorization of entities) (104)
(5) Network analysis (105)
(6) Reporting (106)

Definition of Analysis Scope

Figure 3:
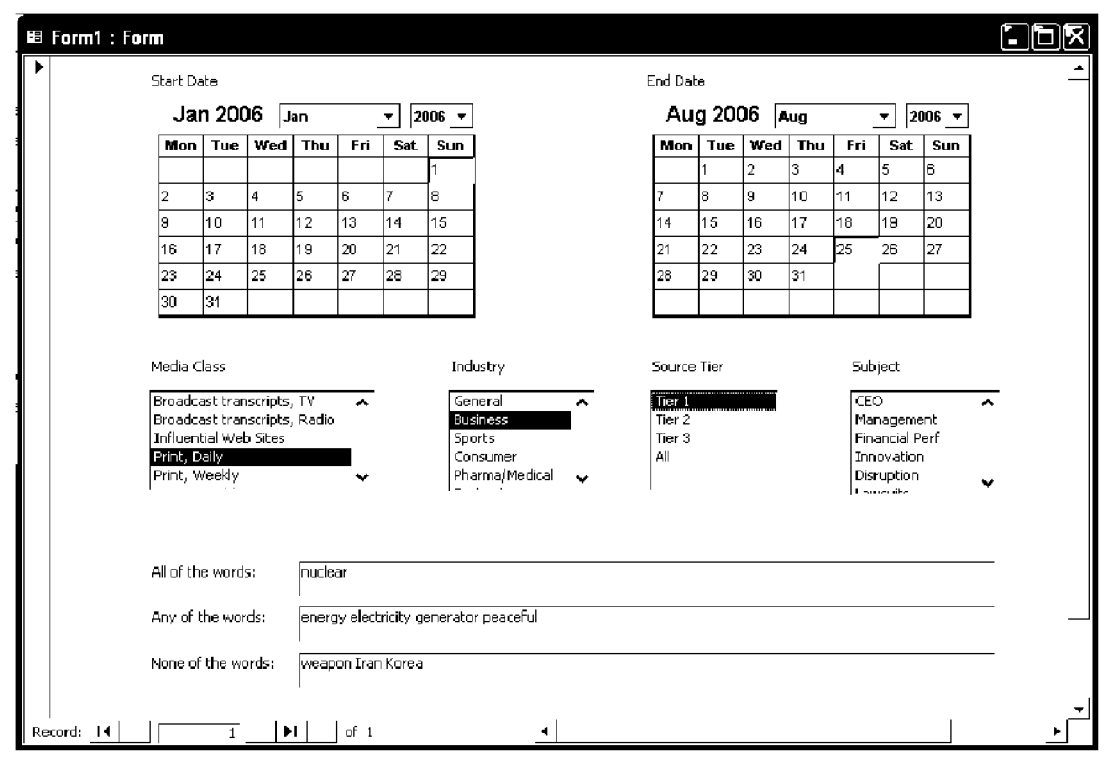

A computerized form is employed to specify the scope of the media content to be included in the analysis, as is illustrated in FIG. 3. The start date is defined with field 1. The end date is defined with field 2. The media class (or multiple media classes) is defined by selecting in field 3 from a list of pre-categorized selection categories associated with each publication in the database. Field 4 may be used to specify that the material to be analyzed should be drawn from sources associated with pre-categorized industries. Field 5 may be used to restrict the analysis to material published in sources of greater or lower influence, as pre-categorized with historical correlation analysis, or a different statistical approach, or on the basis of circulation information or other properties of the source, or on the basis of human expert assessments. In this embodiment field 6 relates to the article, rather than to the source, providing the operation with the opportunity to restrict the analysis to articles pre-tagged with certain subject codes. These tags are associated with each article in the database. The tags may be provided by the publisher, third party content aggregators or be computed with textual analysis. Field 7 allows the operator to restrict the analysis to articles which contain all of the words in the field. Field 8 allows the operator to restrict the analysis to articles which contain any of the words in the field. Field 9 allows the operator to exclude from the analysis the articles which contain any of the words in the field.

Collate Raw Data

This involves connecting to a third party media-archive service (alternatively to the World Wide Web and other electronic public discussion forums accessible through the Internet, including blogs) electronically requesting/gathering certain information, reformatting the incoming data and saving the relevant information in a database structure which maximizes reporting versatility:

Data gathering can include retrieving media from different providers. Examples of such providers are Reuters or Thomson, but also specialists such as ShadowTV who provide computer-searchable transcripts of TV broadcasts. An example of an embodiment of the gathering process is as follows: a human being specifies in a graphical user interface (GUI) on the workstation the details of desired data sets, such as date ranges and companies. The workstation communicates this data to a server computer system. The server transforms the user entry to send an HTTP request via the Internet to the service provider, where the URL used in the HTTP request contains the query details such as the date ranges and desired objects. The service provider responds with delivering (also via HTTP/FTP through the Internet) an XML file.

Data storage & indexing can include parsing the retrieved information and storing it in a structured way such as a computer database. The computer database can either be linked by a computer network to the computer system that gathered the data, or be part of system. The database can ensure by its design the connection between various data sub-sets organized in tables. For reasons set out in the description of the data processing in the latter section of this document, it can be beneficial to store and index articles according to such data elements as article title, the publication where the article appeared, the date of publication, as well as a summary or article "snippet" or in any desired fashion.

The returned data will typically contain identifiable fields, such as date of publication and may be the name of the author. In addition there are usually one or more fields containing extensive bodies of text, such as the main part of a newspaper article, the transcript of a broadcast or a comment made in an electronic discussion forum. Information contained in such text fields are extracted and stored by the subsequent step, Information Extraction.

Information Extraction

Text mining processes are applied to incoming items, subjecting each to a collection of predefined grammar rules, dictionaries, gazeetters (gazeetters is a list of words like titles, first names, abbreviations etc. used to support the identification and classification of the named entities), and statistical dependencies.

Text Mining is about looking for patterns in natural language text and has been defined as "the discovery by computer of new, previously unknown information, by automatically extracting information from different written resources". It recognizes that complete understanding of natural language text is not attainable and focuses on extracting a small amount of information from text with high reliability. Text Mining uses recall and precision scores to measure the effectiveness of different Information Extraction techniques to allow quantitative comparisons to be made. [4]

In one exemplary embodiment, Information Extraction is applied for the recognition and extraction of targeted named entities. The following entities are extracted and stored:
Names of individuals
Names of locations
Names of companies and other organizations
Name of brands and products The process of information extraction in this invention is not limited to named entity extraction only. In other embodiments other information is extracted from the media texts. Examples of extracted information include, but are not limited to, subjects, key messages and phrases, article's summary and tonality.

The entities are stored in the database in such a way that links are maintained between entities and the articles in which they appear. This linkage between entity and article also represents (indirectly) comprehensive information on the co-citation relationships of every entity against the other entities. In addition, since the structured fields are also linked to the article (fields such as publication name and author), the structure also represents accurately the relationship between the structured and unstructured fields, thereby maximizing the reporting versatility.

Numerous systems have been designed and implemented for Named Entity extraction. In principle, the approach applied herein can be described as the definition of rules and patterns used to extract the relevant information. Therefore, a corpus of domain-relevant annotated texts will be available for this task. The rules are defined either by human experts or by machine learning algorithms from annotated texts. Although the involvement of human experts is much more expensive and time consuming, it delivers better results. [3]

A typical Named Entity Extraction system has phases for input tokenization, lexical lookup and part-of-speech tagging, and extraction of the named entities. Depending on the language and the actual application needs some of the phases could be omitted or there can be additional processes. The Tokenization module is responsible for splitting the input text into sentences and tokens. A parts-of-speech-tagger annotates each word of a sentence with its parts of speech tag, such as noun, verb, adjective, and so on. For extracting the named entities, the system needs domain specific extraction patterns (i.e., extraction rules). This is the core of the named entity extraction system. The preceding modules are preparing the text by adding annotations to it. [5]

Pattern Definition is a major part of named entity extraction. It is the task of identifying the extraction patterns that are relevant for the user's need, specified by the user's query. Patterns can be defined automatically, semi-automatically and manually.

In one embodiment of this approach the Entity Extraction rules are composed in an iterative sub-process involving the following steps:

(1) Manual annotation of all named entities in a set of domain relevant texts
(2) Iterative experimental rule definition
(3) Evaluation of rule effect against the manually extracted entities Patterns are described using extended regular expressions on the basis of annotations from previous stages. Those annotation may be introduced e.g. by syntactic rules (like the part-of-speech annotations) or by the application of very large annotational dictionaries (e.g. for geographical entities).

The following is an example of a rule:
EN_Org46=mark(Template_ORG, OrganizationName, PersonalName. space.Token(lower,IN).space, "");
Template_ORG=(Token(Tleft,CD).space)?.Token(capitalized|upper|mixed|abbreviation,NNP|NN|NPS|INN)+;

This rule uses the discovery of a person's name and a preposition as part of the logic to identify in the example below that the string Duke University refers to an organization.

Dr Doraiswamy of Duke University favours label language that would caution doctors . . . .

Figure 2:
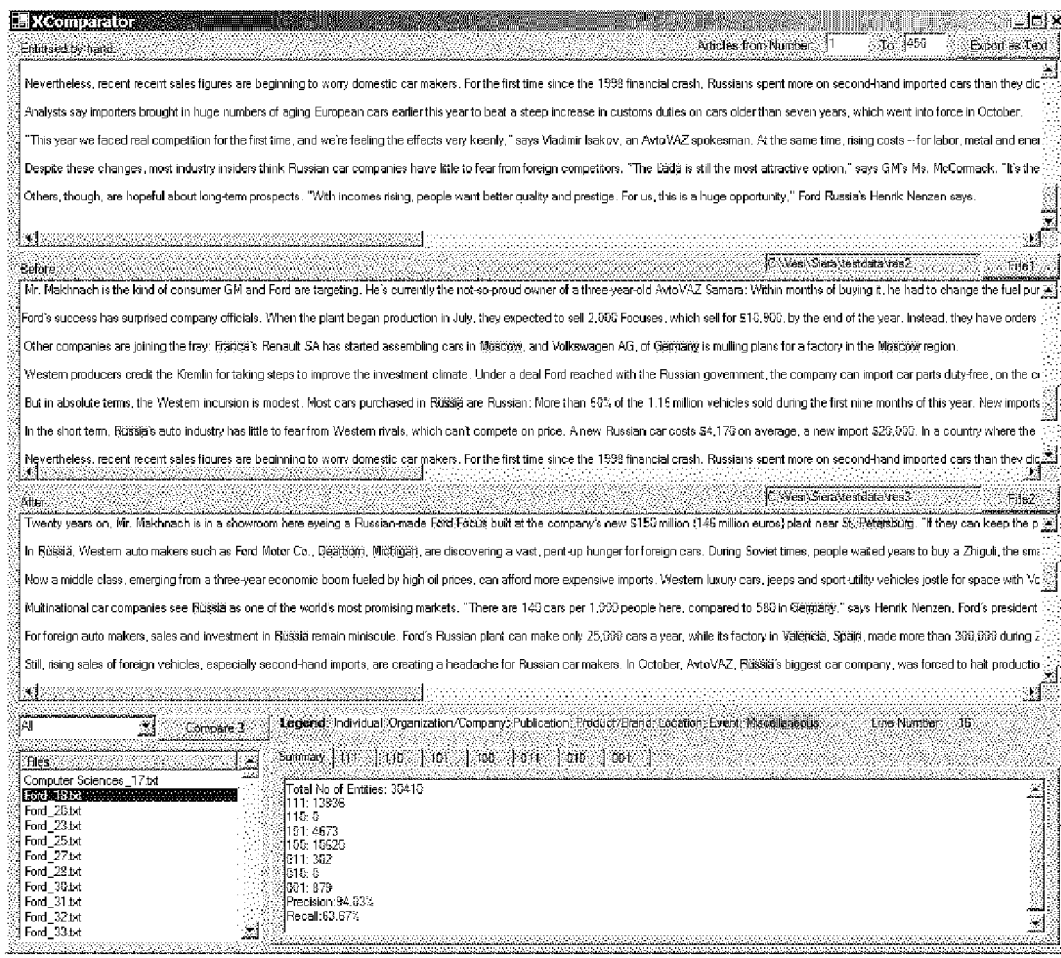
FIG. 2 illustrates an exemplary user interface for the iterative process of refining the tagging rules of an embodiment of the disclosed method.

The tagging results produced by these rules are tested thoroughly in a separate, iterative training process, as illustrated in FIG. 2: The first window shows text that has been tagged manually by an analyst with the discovered entities highlighted in the text. The second window shows the same text as it has been tagged by rules previously applied automatically to the text. The third window shows the same text as tagged after the rule under investigation has been applied.

Manual Entity Enrichment

The text mining processes responsible for the extraction of entities will not usually attain 100% recall and precision, and they may be limited to distinguishing only between certain names of people, locations, organizations and brands. The manual entity enrichment sub-process involves the following steps:

A: Identify and correct errors: For instance, the entity extraction process may have mistakenly tagged the entity Beverly Hills as the name of a person, given that Beverly is a common first name for individuals and that Hills may be a surname.

B: Identify and tag the entities with a sub-category. This is most commonly applied to the name of individuals, providing functional role differentiation. For instance, tagging the names of individuals with one (or more) of the following roles provides the basis for detailed reporting on the functions and roles of the contributors to a public debate
    Journalist
    Corporate Spokesperson
    Politician
    Academic
    NGO Spokesperson C: Identify and tag the entities' attitudes towards the subject in question.

Figure 5:
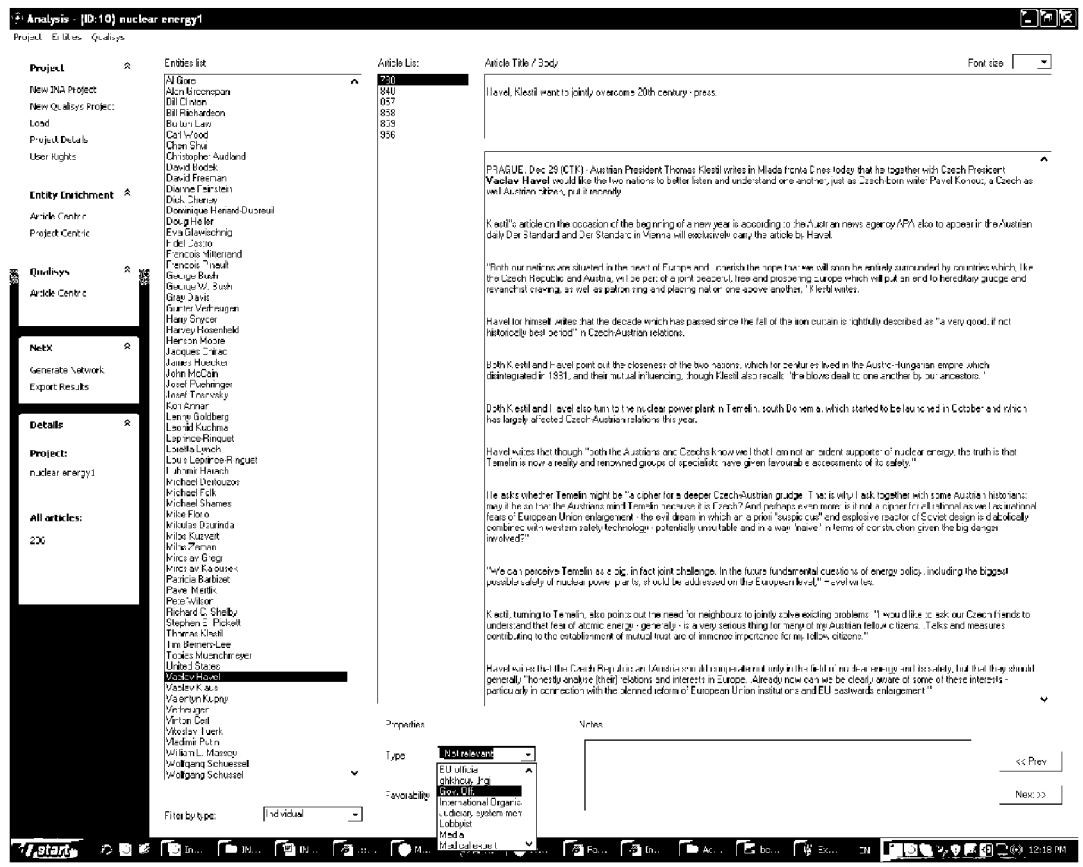
FIG. 5 illustrates an exemplary user interface for the manual entity enrichment of assigning roles of an embodiment of the disclosed method.
Figure 6:
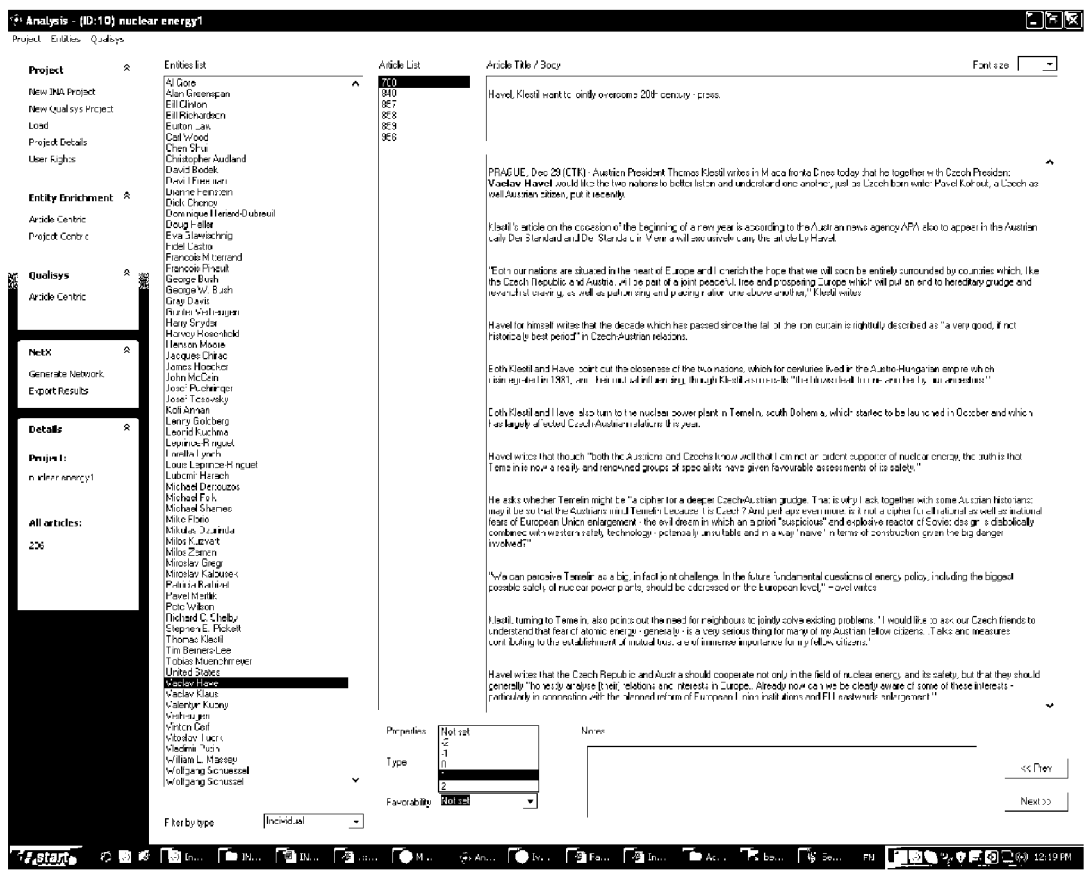
FIG. 6 illustrates an exemplary user interface for the manual enrichment of assigning favorability ratings of an embodiment of the disclosed method.

FIGS. 5 and 6 show an illustration of a software user interface used by the media analyst in the manual enrichment/tagging process. The interface shows in the first column all the individuals, in the second the articles where the individual is cited, and in the third column the article text with the citation highlighted.

The interface allows the analyst to tag individuals not relevant to the project, to add a role to the individual, and to assign a favorability score to the citation by choosing the appropriate value from a list-box.

Network Analysis

This involves computing the following structural properties of the network (a comprehensive discussion can be found in [1], [2]):

Cohesion—network density, connected components, k-scores, overlapping cliques: Cohesion analysis is used mainly for splitting a large group into subgroups with strong ties between their members.

Sentiments and Friendship—unbalanced and balanced cycles: The Friendship analysis can be used for detecting circles of friends and unbalanced cycles in a network.

Affiliation—two-mode networks, m-slices: Affiliation analysis can be used for slicing a two-mode network into slices of individuals, which share a number of common events.

Centrality—degree of centralization, closeness and betweenness centrality: Network centrality accounts for spreading of information and indispensability of central individuals.

Brokers and bridges—bridges, cut-vertices, bi-components, dyadic constraints, structural holes: Individuals with lower constraints (brokers) have better opportunities for brokering information and negotiation.

Diffusion of ideas, stories and information—individuals' exposure and threshold, critical mass: Diffusion analysis is useful for modeling and analyzing the S-shape of a diffusion curve. It can be applied for monitoring and guiding a diffusion process.

Structural prestige—popularity, proximity prestige: Structural prestige analysis can be used for detecting the leaders in a network on the basis of the individuals' choices.

Ranking—balance-theoretic ranking model: Ranking is used for detecting the informal ranks of the individuals in a network.

Reporting

A report will typically be configured to the needs of the particular project at hand, however examples of frequently used elements are:
(1) Summary and key findings
(2) The network plots
   a) Publication mapped against spokesperson
   b) Journalist/Author mapped against spokesperson
   c) Spokesperson mapped against spokesperson
(3) The network characteristics
   a) Cohesion
   b) Density
   c) Influence ranking
   d) Other attributes The dynamics of change can be graphed using many possible techniques, examples are:
(1) Produce a plot for the whole period, where the arcs are labeled in correspondence to the sub-periods.
(2) For each sub-period produce the sub-network containing only the arcs for the corresponding sub-period This sub-process produces a series of plots, which can be visualized consecutively, thus producing the effect of showing the periodic changes in the network dynamics Example of INA In the following, an example of such an INA analysis is given, using the public debate about nuclear energy. The aim of the Nuclear Energy Debate INA project is to show how the global nuclear energy debate evolved between Q4, 2000 and Q4, 2005. The process has to identify the most influential commentators and publications involved in the debate, and determine how favorable or unfavorable commentators are toward the use of nuclear energy. Note that the data and the favorability applied in the example, are simply meant for illustrational purposes and do not necessarily reflect these persons' public view on the topic.

Search: Using an advanced third party search engine and/or a news aggregator, a search is run across more than 4,000 print and newswire media sources to extract relevant information from around the world. To exclude capture relevant articles and exclude articles related to nuclear weapons, which are not relevant to the project, the following search is manually configured and used to retrieve the articles: (nuclear AND energy) NOT (weapon OR iran OR iraq OR korea OR war).

The same search is run twice through the same online aggregator—once for the time period encompassing Q4 of 2000 and a second time for the Q4 of 2005. The date range is selected using the capabilities of the search engine. The search returns a total of 1,689 articles for Q4, 2000 and the one for Q4, 2005 returns 4,641 articles.

Figure 4:
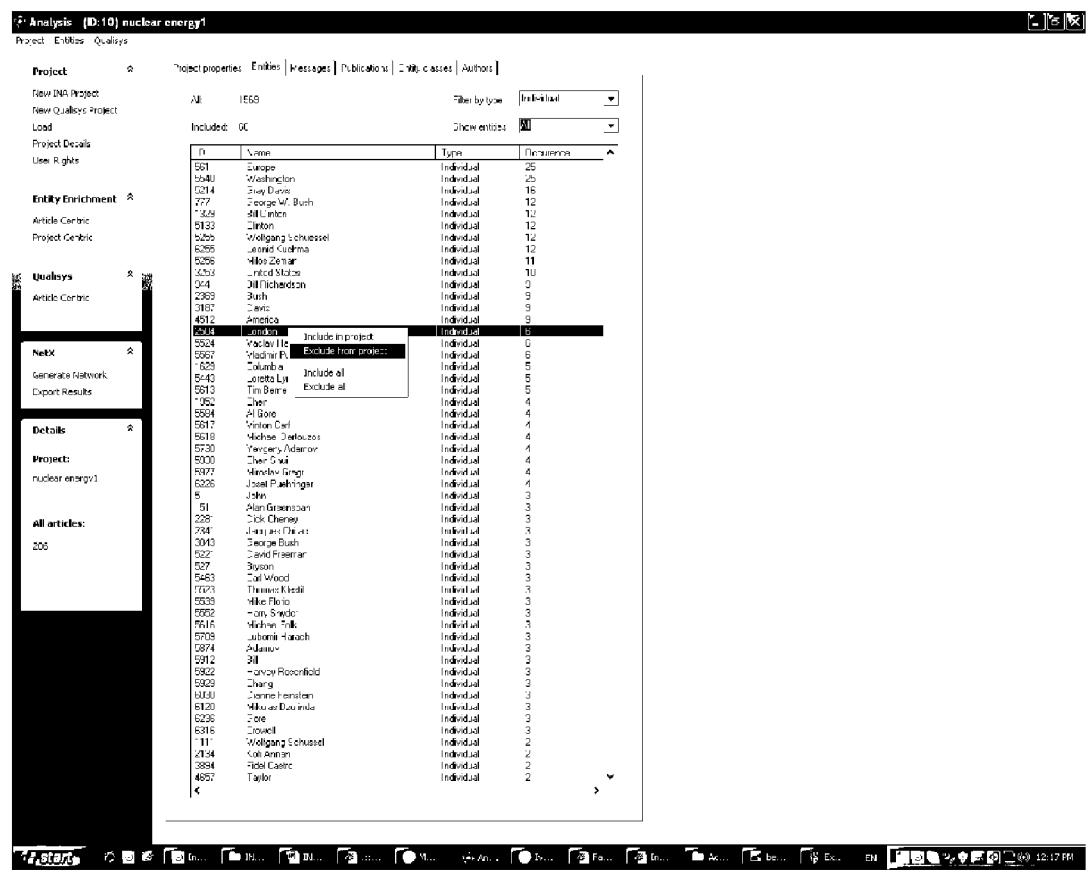
FIG. 4 illustrates an exemplary user interface for the verification process of the automatic entity extraction of an embodiment of the disclosed method.

The retrieved articles are then auto-enriched in the Entity Extraction phase. In the case of the data for Q4, 2000, the auto-enrichment software identified 1,569 entities, of which 66 were spokespeople with mentions in 2 or more articles. In FIG. 4, the extracted entities are shown by ID, name, type and occurrences.

Manual Enrichment: The first step of the manual enrichment is to verify the auto-enriched data. For this purpose analysts manually check the list of extracted entities to exclude irrelevant entities (e.g. London is identified by the entity extraction software as an individual instead of location.). In this step, individuals with a low number of citations are also excluded. (FIG. 4 shows the entity verification process.)

After all irrelevant entities are excluded and the relevant ones are highlighted and linked to publications and/or journalists, media analysts read through the actual article texts to determine relevance, role and favorability. To qualify as relevant, the individual has to comment on the issue of nuclear energy. The individual's role is determined by actual reading of the articles. The possible roles that can be assigned appear in a pre-set drop-down menu (see FIG. 5). This list is project specific and can be updated. For the nuclear energy project, the following roles were applied:
EU official
US official
International organization official
Corporate representative
Journalist
Academic
NGO representative Commentator favorability is determined through human reading of the articles and a favorability grade is manually assigned (FIG. 6). A favorability scale with whole numbers from +2 to −2 is applied. The individuals commenting strongly in favor of the use of nuclear energy are assigned a +2 favorability grade, the ones with a strongly negative comment are assigned a −2 grade, while the rest are assigned a +1, 0, or −1 grade depending on how favorable their comment is in respect to the use of nuclear energy. Some individuals are given a different favorability grade in different articles, in line with the favorability of their comment. In the end result, favorability is presented as an average score from all relevant articles.

Figure 7:
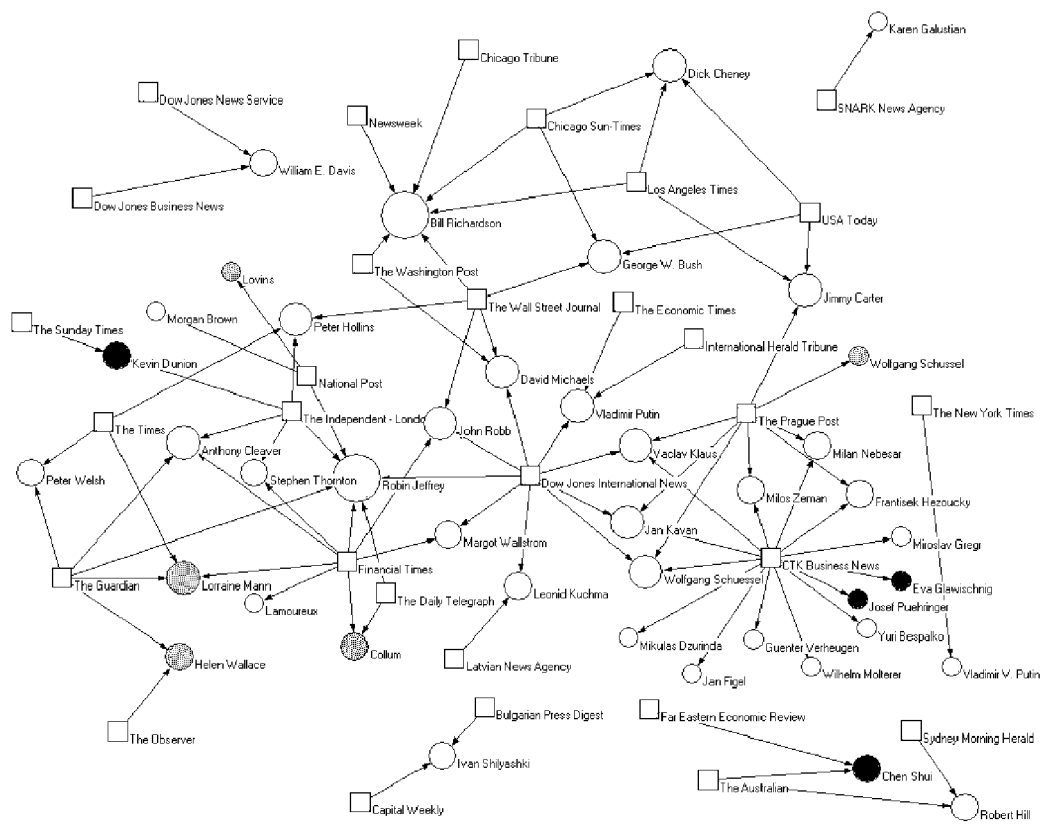
FIG. 7 illustrates an exemplary graphic visualization of the influencer network at a particular point in time (here year 2000).
Figure 8:
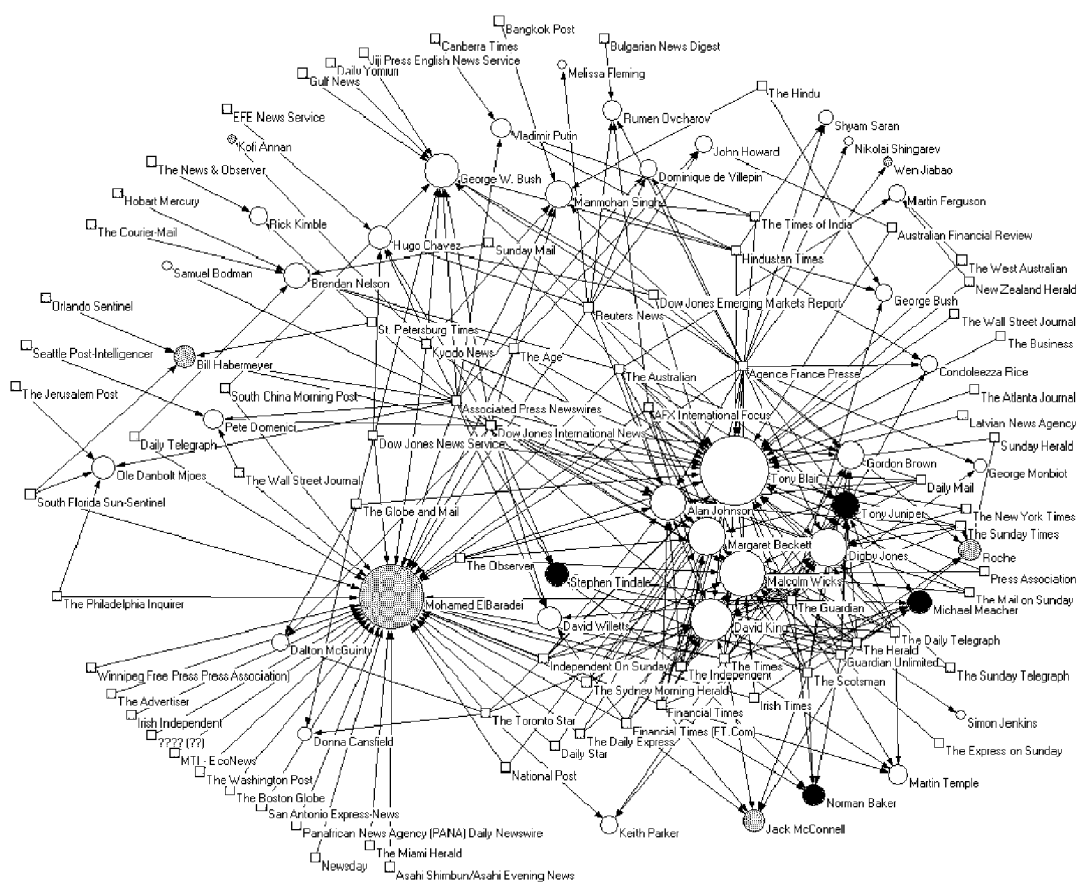
FIG. 8 illustrates an exemplary graphic visualization of the influencer network at a particular point in time (here year 2005).

Visualization: After each of the relevant individuals has been assigned a role and a favorability status, a network visualization is produced with the help of specialized software. The final results are shown in FIG. 7 for Q4, 2000, and FIG. 8 for Q4, 2005. In FIGS. 7 and 8, the squares represent publications, while the circles represent individuals. Individual circle colors show their favorability (or attitude) towards the issue, where black shows negative attitude; white neutral and the grey (dotted) positive. The size of a circle shows the number of citations an individual receives—the larger the circle the more citations.

REFERENCES

The following references are well-known in the domains of social network analysis and text mining:
[1] Wouter de Nooy, Andrej Mrvar, Vladimir Batagelj: "Exploratory Social Network Analysis with Pajek", Cambridge University Press, 2005

[2] Models and Methods in Social Network Analysis, Edited by Peter J. Carrington, John Scott, Stanley Wasserman, Cambridge University Press, 2005
[3] Proceedings of 7th Message Understanding Conference, Fairfax, Va., 19 Apr.-1 May, 1998, http://www-nlpir.nist.gov/related_projects/muc/proceedings/muc_7_toc.html
[4] M. Hearst. What is text mining. 2004, http://www.sims.berkeley.edu/~hearst/text-mining.html
[5] Cunningham, H., Information Extraction, Automatic, Encyclopedia of Language and Linguistics, 2nd Edition, Elsevier 2005, http://gate.ac.uk/sale/ell2/ie/main.pdf

The invention claimed is:

1. A computer-implemented method for a highly automated media analysis of influencer networks, comprising:
    defining, by an application of a computerized selection process of a computer that considers user-entered criteria, one or more scopes of media content to be included in an analysis project;
    retrieving, by the computer, relevant media content from a plurality of providers as defined by the one or more scopes of the analysis project, the media content including published text articles and a body of text for each of the text articles;
    extracting, by an application of an automatic computerized, linguistic-based and statistically-supported entity extraction process, entities from the text articles, the entities being data including names of people, organizations, locations, and brands recited in the body of text of the text articles in the retrieved media content;
    manually associating, selectively and with the aid of the computer, for each of the entities, a functional role of each of the entities for each text article of the retrieved media content;
    manually associating, selectively and with the aid of the computer, for each of the entities, a favorability score for each of the entities for each text article of the received media content;
    storing the entities in a relational database, where the entities that are co-cited in a body of text of the text articles are linked to each other for an associated text article;
    performing, by the computer, a first computation characterizing a network of influence relationships between each of the entities and each text article of the retrieved media content based on the extracted information and the manually associated functional role and favorability of each of the entities; and
    performing, by the computer, a second computation characterizing connection properties of individual entities with respect to the other entities;
    performing, by the computer, a third computation characterizing connection properties of at least a portion of the overall network of influence, the third computation to include a value for the network's cohesion property and density property; and
    outputting a result of the first, second, and third computations to produce a graphical, interactive representation of the network of influence in which a user may select individual entities to examine their associated connection properties, link to other documents, and link to web pages related to the entities, and combinations thereof.

2. The computer-implemented method of claim 1, wherein said entity extraction process can handle a very high volume media content data.

3. The computer-implemented method of claim 1, wherein the third computation includes determining an Influence Influence ranking property for each of the entities.

4. The computer-implemented method of claim 1, wherein the manually associating of the functional role and the favorability score for each of the entities for each text article of the retrieved media content is based on a reading of each text article by a human user.

5. The computer-implemented method of claim 1, wherein the defining of the one or more scopes of media content to be included in the analysis project includes defining a first duration of time and a second duration of time, and the retrieving of media content, the extracting of information, the manually associating, the first, second, and third computing of a characterization, and the outputting of a result of the computation to provide the indication of influencers associated with the network is performed for each of the first and the second durations of time.

6. The computer-implemented method of claim 1, wherein the favorability score associated with each of the entities for each text article of the retrieved media content is determined independently for each text article.

7. The computer-implemented method of claim 1, wherein the text articles are not limited to a specific format or structure.

8. The computer-implemented method of claim 1, further comprising reformatting the retrieved media content for further processing by the method.

9. The computer-implemented method of claim 1, wherein a series of network plots for a sequence of subperiods are produced, which can be visualized consecutively, to produce an effect of showing the periodic changes in the network.

10. The computer-implemented method of claim 1, further comprising outputting a result of the first, second, and third computations to produce a series of graphical representations of the network of influence representing inter-relationships between the entities for several chronological sub-periods, the images of which can be presented consecutively as a movie to visualize a transformation over a period of time.

11. The method of claim 1, wherein the retrieving is performed by a streaming process.

12. The computer-implemented method of claim 1, further comprising an automatic computerized process to associate the functional role and the favorability score for each of the entities for each text article of the retrieved media content.

13. The computer-implemented method of claim 1, further comprising extracting values for structured fields associated with each text article of the retrieved media content, including values associated with at least one of the structured fields of: an author, a title, a date of publication, and a name of a publication associated with each text article.

* * * * *

UNITED STATES PATENT AND TRADEMARK OFFICE
CERTIFICATE OF CORRECTION

PATENT NO. : 7,933,843 B1
APPLICATION NO. : 11/845112
DATED : April 26, 2011
INVENTOR(S) : Goetz von Groll et al.

It is certified that error appears in the above-identified patent and that said Letters Patent is hereby corrected as shown below:

Title Page;

(73) Assignee:

Replace the Assignee

"COMMEQ LTD, London (GB)" with

-- FIDEQ LTD, Cayman Islands (KY) --

Signed and Sealed this
Twenty-seventh Day of September, 2011

David J. Kappos
*Director of the United States Patent and Trademark Office*